United States Patent [19]

Merser

[11] Patent Number: 5,714,099
[45] Date of Patent: *Feb. 3, 1998

[54] METHOD OF FORMING STRUCTURAL PANEL ASSEMBLIES

[75] Inventor: N. Keith Merser, Northbranch, Mich.

[73] Assignee: Foamseal, Inc., Oxford, Mich.

[*] Notice: The term of this patent shall not extend beyond the expiration date of Pat. No. 5,425,908.

[21] Appl. No.: 407,695

[22] Filed: Mar. 21, 1995

Related U.S. Application Data

[63] Continuation of Ser. No. 14,440, Feb. 5, 1993, Pat. No. 5,425,908.
[51] Int. Cl.$^6$ .................................................. B29C 44/06
[52] U.S. Cl. .................. 264/46.4; 264/46.5; 156/78
[58] Field of Search ........................ 264/46.4, 46.5; 156/78, 79; 52/309.5

[56] References Cited

U.S. PATENT DOCUMENTS

| | | | |
|---|---|---|---|
| 3,998,024 | 12/1976 | Frandsen | 52/592.1 |
| 3,999,343 | 12/1976 | Roberts | 52/241 |
| 4,244,901 | 1/1981 | Wencley et al. | 264/46.4 |
| 4,405,063 | 9/1983 | Wydro et al. | 222/146.5 |
| 4,603,531 | 8/1986 | Nash | 52/793.1 |
| 4,748,781 | 6/1988 | Wencley | 52/309.5 |
| 4,835,928 | 6/1989 | Scott | 52/426 |
| 4,859,517 | 8/1989 | Hull | 428/116 |
| 5,041,517 | 8/1991 | Vu et al. | 528/60 |
| 5,425,908 | 6/1995 | Merser | 264/46.4 |

*Primary Examiner*—Allan R. Kuhns
*Attorney, Agent, or Firm*—Howard & Howard

[57] ABSTRACT

The method of forming rigid panel assemblies of this invention eliminates the requirement for mechanical fasteners and may be used to bond wall boards to studs, floor joists to wood flooring such as plywood or OSB boards and trusses to ceiling panels. The method of this invention includes applying a thin bead of a thoroughly mixed two-component liquid polyurethane foamable resin adhesive on the surface where the components are to be joined. The foamable resin is formulated to provide a long tack time or delay curing until the assembly is complete. The foamable resin is then allowed to cream and rise before bonding. Where the bead is applied to the side faces of the support members, the support members are preferably turned to orient the foam beads over the fibrous panel, which is preferably supported on a flat horizontal support surface. Finally, the beads are compressed against the fibrous panel, wetting the panel with liquid foam resin before the foam has galled, permanently bonding the support members to the panel and forming the structural panel assembly. Where an enclosed panel assembly, such as a closed wall is desired, the structural members are attached to a first panel, orienting the support members for application of the polyurethane foam bead, as described.

21 Claims, 2 Drawing Sheets

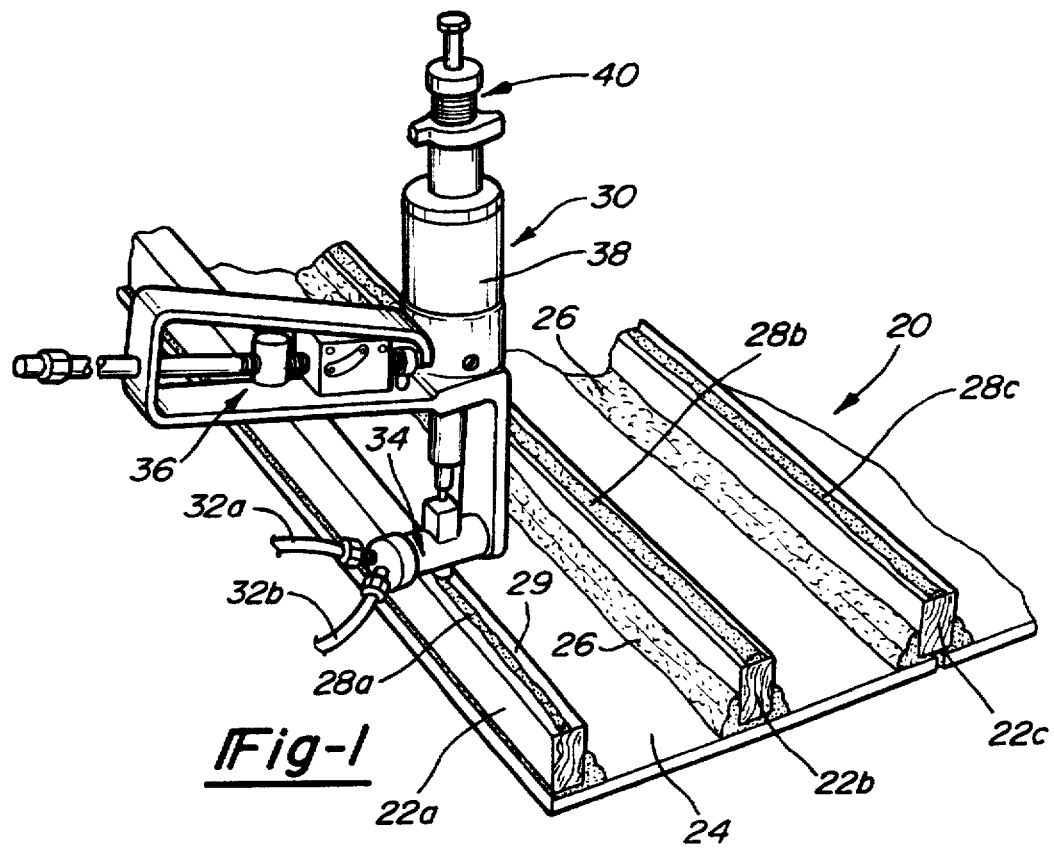
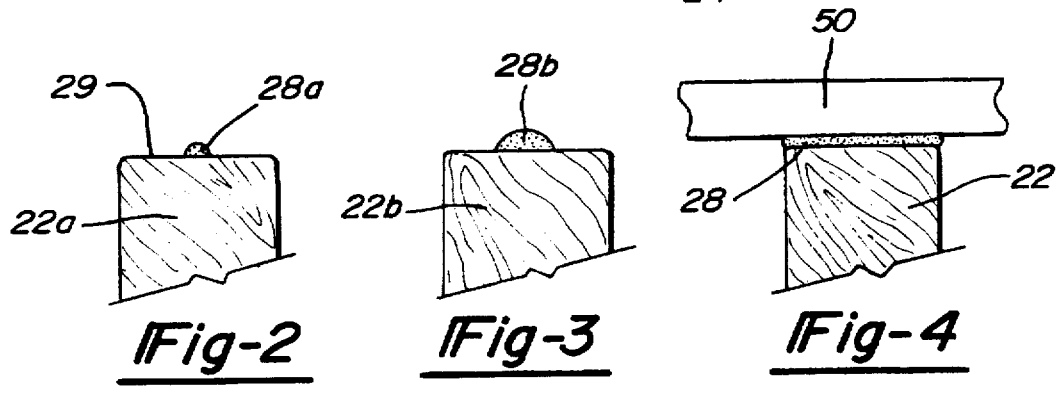
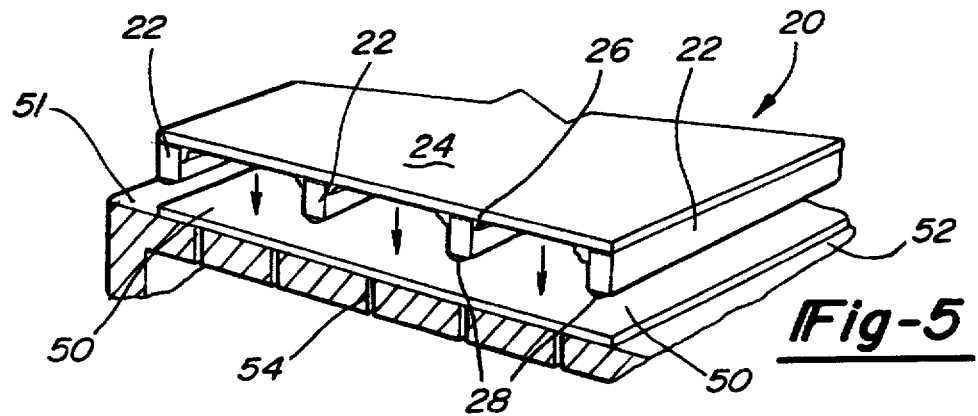

METHOD OF FORMING STRUCTURAL PANEL ASSEMBLIES

BACKGROUND OF THE INVENTION

This is a continuation of application(s) Ser. No. 08/014,440 filed on Feb. 5, 1993, now U.S. Pat. No. 5,425,908.

The present invention relates to a method of making prefabricated relatively rigid structural panel assemblies, such as prefabricated wall, flooring and ceiling assemblies used by the prefabricated or factory built construction industry, such as the manufactured housing industry. The panels are permanently attached to reinforcing studs, joists or trusses, forming a relatively rigid prefabricated module. Closed wall modules include a pair of parallel panels forming the wall surfaces and a plurality of transverse studs permanently attached to the wall boards.

The method of this invention is particularly, but not exclusively, adapted to a process for making such structural panel assemblies without the requirement of mechanical fasteners, such as nails, staples or screws to secure the panel to the structural members, which must be in most cases covered with batten strips. A problem with the manufacture of prefabricated wall, floor or ceiling panel assemblies has been that the components are not uniform. The boards used for studs, joists and trusses do not have a level or straight plane and may have other discrepancies, such as knot holes. The fibrous panels to which such support members are attached are somewhat flexible, but are often warped. Thus, a wall, floor or ceiling panel, which is supported by studs, joists or trusses attached by mechanical fasteners, is generally both warped and spaced from the reinforcing members in many locations. The exposed surfaces of the mechanical fasteners must also generally be covered, this is to hide fasteners popped out after construction because of inherent assembly and/or user movement and stresses resulting from the warped components. These problems can only be partially solved in "stick built" construction, where the wall, floor or ceiling panel assemblies are built entirely on site, by selection of materials, the use of shims, etc. However, factory or pre-built construction preferably utilizes mass production techniques which do not lend themselves to such hand-made adjustments.

U.S. Pat. Nos. 4,244,901 and 4,748,781, assigned to the assignee of this application, disclose methods of forming reinforced panel assemblies utilizing polyurethane foam to bond the structural support members to the panels. In the preferred embodiment, the panel is laid upon a flat support surface. The studs or support members are located on the back of the panel and clamped. A high pressure stream of a liquid foamable resin is then directed to the juncture of the support members and the panel, such that the resin foams and fills the space between the support members and the panel, permanently bonding the support members to the panel without mechanical fastening means. This method has been commercially successful in making prefabricated or factory-built structural panels; however this process is not suitable for enclosed panel construction, such as a closed wall structural assembly.

The method of this invention has advantages over the prior art and is suitable for the manufacture of enclosed panel structures, such as closed wall assemblies used by the manufactured construction industry. The disclosed method may be substantially automated and utilizes a relatively small amount of foamable resin adhesive. The method of this invention may also be used at any temperature normally encountered by the factory-built construction industry. Upon completion of the reinforced panel assembly, the assembly can be moved almost immediately using conventional mass production material handling techniques.

SUMMARY OF THE INVENTION

As stated, the method of this invention is particularly suited for the manufacture of reinforced structural fibrous panels, such as used by the manufactured construction industry for walls, floors and ceilings. The method of this invention may also be adapted for mass production techniques utilizing the materials now used by the prefabricated or factory-built construction industry.

In the method of this invention, the reinforcing members, which may be wall studs, ceiling trusses or floor joists for example, are oriented and supported vertically, such that the relatively thin side faces are located at the top of the support members. Where an enclosed structural assembly, such as a closed wall is to be manufactured, the support members are preferably first attached to one panel and the panel is supported on a horizontal surface, such that the support members extend vertically from the first panel. The support members may be attached to the first panel by the methods disclosed in the above-referenced U.S. Pat. Nos. 4,244,901 or 4,748,781. As disclosed in U.S. Pat. No. 4,748,781, the structural support members may also be metal channels.

The method of this invention then includes applying a thin bead of a thoroughly mixed two-component liquid polyurethane foamable resin adhesive axially along the top side surfaces of each of the support members. The foamable resin adhesive must have a relatively long tack time and is preferably resilient or pliable, having good wetting characteristics, green strength and fast reacting with controlled cure, such that the time that the foam remains resilient and tacky can be extended and controlled. The preferred foamable resin is of relative low viscosity and is also thixotropic, such that the resin can be thoroughly mixed in an impingement mixing chamber of an application gun, but such that the bead does not run upon application. The foam is then allowed to substantially fully cream and rise, forming a liquid foam polyurethane bead. The support surfaces of the support members having the foamed polyurethane bead are then pressed against the panel to be joined to the support members, compressing the polyurethane beads and wetting the panel, permanently bonding the support members to the panel, without requiring mechanical fasteners. This must be completed before the polyurethane foam beads cure tack free or the polyurethane foam will not wet the surface of the panel and bond sufficiently.

In certain applications, such as where the application gun is computer controlled, it may be desirable to apply the foam bead to the panel first, rather than the support members. In such an application, the panel will be laid upon a flat support surface. A predetermined pattern of polyurethane beads are then applied to the panel with the pattern of beads corresponding to the desired locations for the support members. Where a double walled structure is to be made, the structural support members are first applied to a second panel, as described, or the support members may be supported in a fixture. The side faces of the support members are then applied to the polyurethane beads, permanently bonding the structural support members to the panel, as described.

In the most preferred method, the panel which is to be bonded to the support members is first laid upon a flat horizontal support surface. After applying the bead to the support members, the support members are turned or rotated to orient the surface having the polyurethane foam bead downwardly over the flat panel and the support surfaces are then pressed against the panel to compress the foam beads, wetting the panel surface and permanently bonding the support members to the panel. The foam beads thus fill in any imperfections or warped areas of the reinforcing support members and the panel remains flat following attachment of the support members. Further, neither the panel nor the support members are stressed during attachment and no mechanical fastening means is required.

The polyurethane foam bead is preferably applied axially along substantially the entire length of the reinforcing support members at a relatively slow forward velocity to avoid splatter and assure a good bond between the structural reinforcing members and the panel. To avoid splatter, the gun should be moved at about the forward velocity of the resin exiting the gun. A liquid resin bead having a width of about ¼ inch applied at an application rate of less than about 3 feet per second has been found suitable for most hand applications. A two-component liquid foamable polyurethane resin adhesive is also preferred. The foamable resin adhesive should be relatively slow acting and the formulation is preferably adjustable to accommodate the environment of the application. In the most preferred embodiment, the liquid polyurethane foamable resin begins to cream almost immediately and substantially fully rises within a few minutes, such that the foam bead is ready for bonding, as described. The foam bead must be pressed against the panel or structural member before the foam cures or the foam will not satisfactorily wet and bond sufficiently. Thus, the polyurethane foam should be formulated for the particular application. In the most preferred embodiment, the foam fully rises quickly, but the foam does not cure tack free for at least 10 minutes and may, if preferred, not cure for about 20 minutes. In most preferred applications, a polyurethane foam which cures in 15 to 20 minutes has been found to be particularly suitable for mass production applications.

The method of making a structural panel assembly of this invention is thus particularly suitable for the manufacture of prefabricated or factory-built reinforced fibrous panel assemblies, including rigid enclosed panel assemblies, such as closed wall modules used by the construction industry. A closed wall assembly may be built by the method of this invention without using mechanical fasteners or clamps and both walls may be substantially perfectly flat using mass production techniques. The reinforced wall construction may be handled using industrial mass handling techniques almost immediately upon completion of the bond and without requiring clamps. Other advantages and meritorious features of the method of this invention will be more fully understood from the following description of the preferred embodiments, the appended claims and the drawings, a brief description of which follows.

BRIEF DESCRIPTION OF THE DRAWINGS

FIG. 1 is a perspective view of a panel assembly illustrating the application of a foam bead on the structural support members;

FIG. 2 is a partial end view of a structural support member immediately after the application of a bead of liquid foamable resin adhesive;

FIG. 3 is a partial end view of a structural support member, similar to FIG. 2, after the bead has substantially fully creamed and risen;

FIG. 4 is an end view of a structural support member bonded to a finish panel;

FIG. 5 is a top perspective view illustrating a preferred method of applying the structural support members to the finish panel;

DESCRIPTION OF THE PREFERRED EMBODIMENTS OF THE METHOD OF THIS INVENTION

Figure 6:
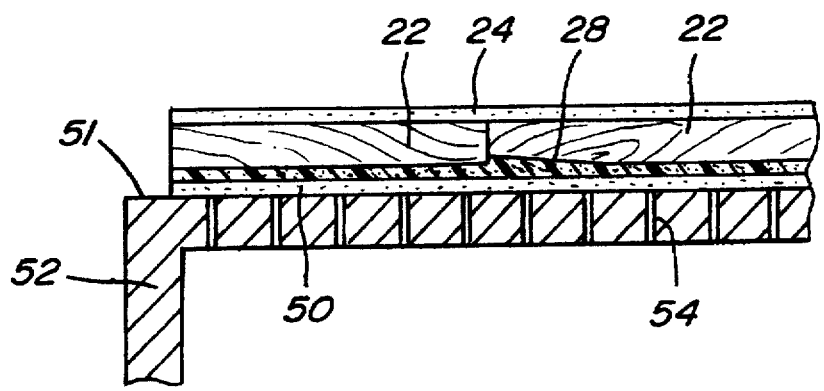
FIG. 6 is a side view of a rigid structural panel assembly formed by the method of this invention.

As described above, the method or process of this invention is particularly suitable for making structural panel assemblies without requiring mechanical fasteners. The method of this invention will form panel assemblies having a completely flat finish panel, although the structural support members are warped or irregular and the panel was initially warped or "wowed." The structural panel assemblies which may be formed by the method of this invention, include prefabricated wall, flooring and ceiling assemblies roof decking and outside walls such as used by the manufactured housing, recreational vehicle and prefabricated industrial building industries. The method of this invention may also be used to make closed wall modules having parallel panels supported by studs permanently adhesively bonded to the panels.

FIG. 1 illustrates a method of forming a first panel assembly 20 as may be utilized in the method of this invention. As shown, the panel assembly 20 includes a plurality of generally parallel structural members 22a, 22b and 22c which have been secured to a first panel 24 by foam resin adhesive as described, for example, in the above-referenced U.S. Pat. No. 4,244,901. Such structural support members 22 are commonly referred to as studs in wall assemblies, joists in floor assemblies and trusses in ceiling assemblies. In the disclosed embodiment of the first panel assembly 20, the structural support members 22 are wood, such as the wood 2×4's commonly used for studs in wall assemblies. It will be understood, however, that the structural support members 22 may be formed of any material used by the construction industry, including the channel-shaped metal structural support members disclosed in U.S. Pat. No. 4,748,781 and the structural support members may be secured to the first panel 24 by any suitable means, including mechanical fasteners. However, as described in the above-referenced U.S. patents, the structural members 22 may be bonded to the first panel 24 by a thin high pressure stream of polyurethane foam adhesive directed to the base of the structural members, forming a flat panel assembly.

In the method of this invention, a thin bead 28 of a thoroughly mixed two-component liquid polyurethane foamable resin adhesive is applied to the thin side faces 29 of the structural members which are to be bonded to the finish panel, as described below. As shown, the foamable resin adhesive is applied to the structural members by a foam application gun 40. The disclosed embodiment of the foam application gun includes lines or hoses 32a and 32b which receive and deliver the A-isocyanate and B-resin components of the foamable resin adhesive, to an impingement mixing chamber 34 described more fully hereinbelow, a trigger assembly 36, a pneumatic cylinder assembly 38 and a manual screw adjustment assembly 40 which adjusts the throw of the valve rod shown in FIGS. 8 and 9. The disclosed embodiment of the application gun 30 is a commercially available Model D spray gun sold by Gusmer Corp. of Lakewood, N.J. Of course, other two-component liquid foamable resin adhesive spray guns having a high velocity impingement mixing chamber or module can also be used. Another suitable foam application gun is the Model GX-7 gun having a high impingement module available from Gusmer Corp. Although conventional two-component foam spray guns may be used, the gun must be modified or adjusted, as described below, to produce a relatively low forward velocity stream of thoroughly mixed polyurethane foam resin adhesive to produce a relatively thin bead of foamed resin adhesive for the method of this invent ion.

In the method disclosed in FIG. 1, a thin foam bead 28a of liquid foamable resin adhesive is being applied to the top face 29 of structural support member 22a by foam application gun 30. The first panel assembly 20 may be supported on a horizontal surface or angled to reduce floor space. The gun is preferably moved at about the forward velocity of the liquid stream of polyurethane foamable resin adhesive exiting the application gun 30, such that there is substantially no splatter. The gun may be hand-held, as shown, or the gun may be supported on an application machine which may be computer controlled. As shown in FIG. 1, the bead 28a is very thin, as applied. The liquid foamable resin adhesive bead begins to cream and rise, however, almost immediately following application, such that the bead is substantially fully creamed and expanded as shown at 28b (see FIG. 3) within a few seconds after application, preferably less than 3 seconds. In a typical application where the foam bead is applied to the thin face of a 2×4 inch structural support member, a liquid bead having a width of about ¼ inch upon application has been found to be very effective. The bead then creams and rises to about double the original height and width, or about ½ inch, as shown at 28b and 28c in FIG. 1 and 28b in FIG. 3.

A two-component polyurethane foamable resin adhesive was especially formulated for the method of this invention. As described, the forward velocity of the liquid foamable resin adhesive exiting from the application gun is relatively low to form a bead without splatter, preferably less than about 5 feet per second or about 1 to 3 feet per second for hand-held gun applications. The A and B components of the foamable polyurethane resin must, however, be thoroughly mixed before application. To achieve thorough mixing, an application gun having a relatively high pressure impingement mixing chamber was selected and used with relatively low viscosity liquid foamable resin components. When applied, however, the foamable resin bead should not run. To achieve this result, a thixotropic formulation was developed which begins to cream and rise almost immediately upon application, but at the same time has an extended rate of cure time.

Further, as described, the method of this invention is particularly suitable for forming wall, ceiling and flooring assemblies for prefabricated construction industries, such as the manufactured housing industry. Thus, the polyurethane foamable resin is preferably formulated for use at a relatively wide range of ambient temperatures, preferably between about 30 and 100 degrees Fahrenheit. Humidity should not adversely affect the resultant bond. Finally, the method of this invention is also suitable for mass production of structural panel assemblies, including automated assembly processes. Thus, the foamable resin adhesive preferably sets up and cures in a controlled manner. In most applications, it is preferred that the foamable resin adhesive cures in about 10 to 30 minutes, permitting completion of the assembly before the foam beads fully cure tack free. For most applications, the foamable resin adhesive should fully rise in less than 2 minutes and cure in 15 to 25 minutes at the ambient temperature where the beads are applied. Of course, the foamable resin adhesive must also provide an excellent bond between the structural support members and the panel. To accomplish good bonding with the method of this invention, the foam bead must have good wetting characteristics, a relatively long tack time and good green strength. As described, the reinforced panel assembly formed by the method of this invention can be picked up and handled almost immediately following completion of the assembly.

Current polyurethane systems used by the factory-built construction industry include single component moisture cured polyurethane foams and dual component static mix systems. With the moisture cure process, the manufacturer is limited in its use because the cure/set time varies from 0.75 hours to more than 1.5 hours. The dual component polyurethane systems presently available use a static mix process that is both costly and involves a solvent flush, such as methylene chloride. With a solvent flush, the uses are limited because of environmental problems and hazardous waste disposal requirements. The two-component polyurethane foamable resin adhesive of this invention is water blown and mixed in the application gun, eliminating the requirement for static mixing, solvent cleaning and the like and permitting use in the method of this invention.

The following formulation was developed by Applicant for the B polyol side of the resin adhesive:

| Constituent | Weight Percent |
| --- | --- |
| PG 76–120 | 90–92% |
| R 420 | 4.5–5.5% |
| L 5420 | 1.4–1.45% |
| $H_2O$ | 2.5–2.6% |

PG 76-120 is a polyether polyol available from Olin Corp. PG 76-120 has improved wetting characteristics, reduced viscosity and improves the plyability of the polyurethane foam. It also reduces fryability and reduces stryration or crystalization. R 420 is also a polyether polyol available from Texaco Chemical Co. which provides improved reactivity. L 5420 is a silicone surfactant available from Union Carbide Chemicals & Plastics Co., Inc. The $H_2O$ is distilled water. The A-isocyanate side of the formulation is 100 percent methylene bis 4-phenyl-isocyarate available from Miles Inc. and ICI Americas, Inc.

The above formulation is suitable for applications at most ambient temperatures encountered under production conditions greater than about 45° F. At lower ambient temperatures or temperatures between about 30° F. and 65° F., the following formulation has been found to be particularly suitable for the B polyol side of the foamable resin adhesive:

| Constituent | Weight Percent |
| --- | --- |
| PG 76–120 | 73–76% |
| R 420 | 20–22% |
| L 5420 | 1.5% |
| 33 LV | 0.6% |
| $H_2O$ | 2.2% |

33 LV is an amine catalyst available from Union Carbide Chemical & Plastics Co. As will be understood by those skilled in the art, adjusting the polyether polyol ratio and adding an amine catalyst makes the foam formulation "hotter", providing a good foam bead at colder ambient temperatures. The A iso side of the formulation may be the same as the formulation described above.

The green shear strength of the described foam resin adhesive utilized in the method of this invention is as follows:

| Time | Shear Strength |
|---|---|
| 10 min. | 117.00 psi |
| 11 min. | 121.30 psi |
| 13 min. | 136.80 psi |
| 17 min. | 199.00 psi |
| 20 min. | 254.80 psi |
| 24 hrs. | 604.30 psi |

Thus, the reinforced panel assembly formed by the method of this invention can be picked up and handled by conventional material handling techniques within a few minutes after bonding.

After the foam bead 28 is applied, as shown in FIG. 1 at 28a, the bead is allowed to substantially fully cream and rise, forming an enlarged foam bead on the surface 29 of the structural support members which are to be bonded to the finish panel 50. As shown in FIG. 4, the finish panel 50 may be applied on top of the bead and pressed. More preferably, the first panel assembly 20 may be turned as shown in FIG. 5 and the support members applied to the finish panel supported on a flat Surface, such as a vacuum table 52. In either method, the volume of the bead 28b should be sufficient to completely bridge the mating surfaces of the finish panel 50 and the structural support members 22 as shown in FIG. 4. Where a flat finish panel is desired, the panel is first laid on a flat support surface, such as the vacuum table 52 shown in FIG. 5. A vacuum table having a plurality of holes 54 may be desired where the panel is relatively flexible, but is warped or includes "wows". Vacuum tables are commonly used to maintain a flexible sheet, board or panel flat while it is being worked upon.

As stated above, FIG. 5 illustrates a preferred embodiment of the method of this invention. As shown, the first panel assembly 20 is turned or rotated, such that the beads 28 overlie the finish panel 50, which is supported on the vacuum table 52, as described above. The first panel assembly 20 is then pressed against the finish panel, compressing the beads 28 against the finish panel. The polyurethane foam then wets the finish panel, forming a bridge between the finish panel 50 and the structural support members 22, as shown in FIG. 4. Thus, it is necessary to complete this step before the polyurethane foam beads fully cure tack free. Further, the polyurethane foam beads must be sufficiently flexible to bridge the interface between the structural members and the finish panel. The completed structural panel assembly may be lifted and handled almost immediately upon pressing of the structural members 22 against the finish panel. That is, the bonding is almost instantaneous, which is an important advantage of the method of this invention.

Figure 7:
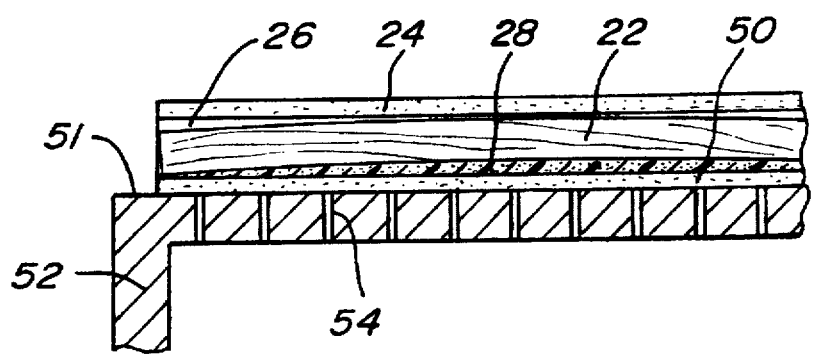
FIG. 7 is another side view of a rigid structural panel assembly formed by the method of this invention.

FIGS. 6 and 7 illustrate structural panel assemblies formed by the method of this invention. As described above, the finish panel 50 is preferably first laid upon a flat surface 51. In the disclosed embodiment, the flat surface is provided by a vacuum table 52 having a plurality of spaced holes 54. A vacuum is drawn on the underside of the table 52 which draws the panel 50 against the flat surface 51, ironing out any warpage or "wows" in the flexible panel 50. FIG. 6 illustrates a common situation where the structural support members 22 are of different widths. As stated above, the structural support members 22 are commonly 2×4's or 4×6's as used for studs in wall panel assemblies, joists in flooring assemblies and trusses in ceiling assemblies. The dimensions of such lumber, however, vary significantly. The long side may vary as much as ½ inch. As shown, however, the foam bead 28 fills in the additional space required by the thinner structural members, such that the finish panel 50 remains completely flat. FIG. 7 illustrates the situation where the structural member 22 is warped or bowed. As shown, the foam bead 28 will similarly fill the concave areas, such that the finish panel 50 remains flat. As described, the finish panel is retained flat on the vacuum table 52 when the first panel assembly is turned and applied to the finish panel, as shown in FIG. 5.

Figure 8:
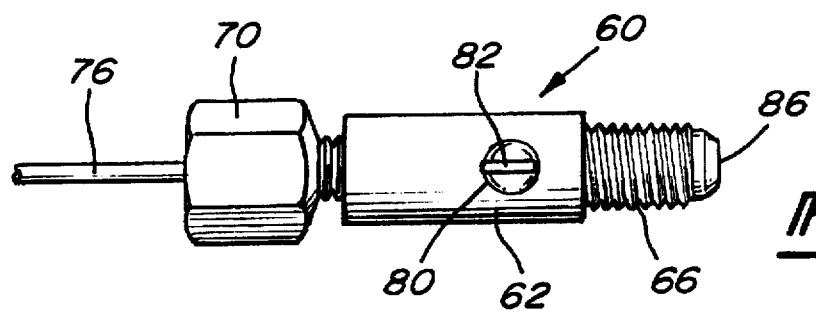
FIG. 8 is a side view of an impingement mixing chamber of a foam application gun suitable for use in the method of this invention.
Figure 9:
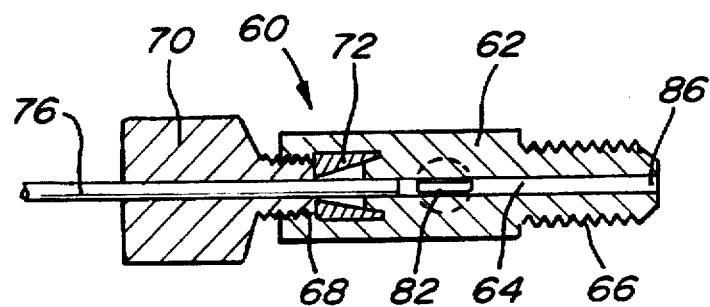
FIG. 9 is a side cross-sectional view of the mixing chamber shown in FIG. 8.

FIGS. 8 and 9 illustrate a mixing chamber 60 of the foam application gun 30 of FIG. 1. The mixing chamber 60 includes a cylindrical body 62 having an axially bore 64 which defines the mixing chamber. The end 66 is externally threaded to receive a nozzle (not shown) and the opposite end is counterbored at 68 to receive a ferrule 72 and internally threaded to receive a packing or lock nut 70. A valve rod 76 is reciprocated in the axial bore 64 by the pneumatic cylinder assembly 38 of FIG. 1 as described below.

When the value rod is retracted, the A and B components of the foam resin adhesive enter the mixing chamber 64 separately through very small slots 82 on opposite sides of the valve body 62. Hardened inserts 80 may be provided to reduce wear. The slots have a width of about ½ the diameter of the bore mix chamber 64, such that the high impingement force of the foamable resin components entering the chamber is dissipated sufficiently to generate a low velocity bead, as described above. In an actual embodiment, the width of the slot 82 was 0.046 inches and the diameter of the bore mixing chamber 64 was 0.078 inches. The viscosity of the A iso side was 250 cps and the B polyol side was 560 cps. The inlet pressure was 400 psi. The A and B components were thoroughly mixed in the high impingement mixing chamber and exited the bore at about 3 feet per second, forming a relatively thin bead of foamed resin adhesive without splatter, as described above.

The foam application gun 30 shown in FIG. 1 is operated by actuating the trigger mechanism 36, which operates the pneumatic cylinder to ratrack the valve rod 76 beyond the slot 82, permitting the A iso and B polyol components of the foamable resin to enter the mixing chamber 64 under high impingement pressure, where the components are thoroughly mixed. The foamable resin adhesive then exits the outlet 86 of the mixing chamber, where it is applied in the form of a thin liquid bead 28a as shown in FIGS. 1 and 2. Almost immediately, the liquid bead creams and rises, forming the foam beads 28b and 28c as shown in FIGS. 1 and 3. The application gun 30 may be hand-held or the gun may be supported on a movable fixture and computer-controlled, for example. Where the gun is computer-controlled, it may be preferred to apply the foam beads first to the finish panel 50. The structural support members may be secured to a first panel 24 as shown in FIG. 1, or the structural support members 22 may be oriented and supported in a jig or fixture, eliminating the requirement for a first panel in a floor assembly, for example.

The foam 28 preferably substantially fully bridges the interface between the structural support members 22 and the finish panel 50 as shown in FIG. 4, such that the finish panel 50 does not contact the structural support members 22. The cellular foam adhesive provides a resilient joint between the structural support members and the finish panel and a thermal break. These advantages are provided even where the foam bead is interrupted at predetermined locations to reduce cost.

As will be understood by those skilled in the art, various modifications may be made to the method of forming structural panel assemblies of this invention and the resultant improved rigid structural panel assembly within the purview of the appended claims. For example, the structural support members 22 may be attached to the first panel 24 by any suitable means, including mechanical fasteners, although the use of foam adhesives had several advantages over the prior art, as described above. Further, although an important advantage of the method of this invention is the elimination of mechanical fasteners, mechanical fasteners may also be used between the finish panel and the structural support members. Finally, although the foam resin bead is preferably applied to the structural members, as described above, the bead may alternatively be applied first to the finish panel.

I claim:

1. A method of permanently bonding a pair of relatively flexible support panels to a plurality of structural support members to form a rigid enclosed structural panel assembly without mechanical fasteners or clamps, said method comprising the following steps:

(a) laying a first of said panels on a flat support surface;
    (b) making a first panel assembly comprising said first panel and said support members, said support members being connected to said first panel and extending from a surface of said first panel, and orienting and supporting said support members in an orientation to be bonded to a second of said panels, each of said support members having a generally flat end face which is to be bonded to said second panel;
    (c) thoroughly mixing a two-component foamable polyurethane resin adhesive in an impingement mixing chamber of a foam application gun;
    (d) applying a plurality of substantially continuous thin beads of said two-component foamable polyurethane resin adhesive with said application gun to a surface of said second panel, said beads having a width substantially less than about the width of the support member end faces;
    (e) allowing said two-component foamable polyurethane resin adhesive beads to substantially fully cream and rise, forming enlarged polyurethane foam beads on said surface of said second panel; and
    (f) pressing said surface of said second panel against said support members, compressing and spreading said enlarged foam beads, permanently bonding said second panel to said support members and forming said rigid enclosed structural panel assembly.

2. The method as recited in claim 1, wherein said method includes applying a foam bead of sufficient volume to substantially fully bridge the interface between said surface of said second panel and said support members, such that said second panel and the support member end faces generally do not touch.

3. The method as recited in claim 1, wherein said method includes turning said first panel assembly after said adhesive beads have substantially fully creamed and risen so that the support member end faces are oriented downwardly overlying said second panel, then pressing the support member end faces against said second panel, compressing and spreading said beads between the surface of the second panel and the support member end faces, thereby wetting substantially the entire support member end faces and permanently bonding said support members to said second panel.

4. The method as recited in claim 1, wherein the formulation of said two-component foamable polyurethane resin adhesive is modified to cream and substantially fully rise in less than two minutes and cure within ten to thirty minutes and the temperature of said two-component foamable polyurethane resin adhesives beads when applied ranges from 30°–100° F.

5. A method of making a relatively rigid enclosed structural panel assembly comprising a pair of relatively flat, flexible, fibrous structural panels and a plurality of transverse support members permanently bonded to and reinforcing said panels, said method comprising the following steps:

(a) laying a first of said flexible fibrous structural panels on a flat support surface;
    (b) making a first panel assembly comprising said first panel and with said support members being connected to said first panel, said support members extending vertically from a surface of said first panel, and orienting and supporting said support members vertically in spaced, generally parallel relation, each of said support members having a generally flat elongated support surface located at the top of said support member;
    (c) laying a second of said panels on a flat support surface;
    (d) applying a thin bead of a thoroughly mixed liquid foamable resin adhesive having a relatively long tack time generally axially along said support surface of each of said support members, said bead having a width substantially less than about the width of said support surface;
    (e) allowing said foamable resin adhesive bead to substantially fully cream and rise, forming an enlarged foam bead on said support surfaces; and
    (f) turning said first panel assembly to orient said support surfaces downwardly over said second panel and applying said support surfaces having said foam beads against said second panel while said second panel is located on said flat support surface and pressing said support surfaces against said second panel while said foam beads remain flexible and before said foamable resin adhesive has cured tack-free, compressing and spreading said beads, thereby wetting said second panel with said foamable resin adhesive and permanently bonding said first panel assembly to said second panel, forming said relatively rigid enclosed structural panel assembly.

6. A method as recited in claim 5, wherein said foamable resin adhesive comprises a thixotropic, two-component foamable resin adhesive and said method includes thoroughly mixing components of said two-component foamable resin adhesive in an impingement mixing chamber of a foam application apparatus, then developing a relatively slow forward velocity stream of said foamable resin adhesive exiting said foam application apparatus.

7. A method as recited in claim 6, wherein said method includes applying a uniform thin bead of liquid foamable adhesive at about said relatively slow forward velocity on said support surfaces of said support members without substantial splatter.

8. A method as recited in claim 5, wherein said method includes modifying the formulation of said foamable resin adhesive depending upon the temperature to cure in ten to thirty mutes following application of said beads.

9. A method as recited in claim 8, wherein said formulation of said foamable resin adhesive is adjusted to cream and substantially fully rise in less than two minutes and cure in about fifteen to twenty-five minutes.

10. A method as recited in claim 9, wherein said formulation of said foamable resin adhesive is modified to fully cream and rise in about one minute and cure in about eighteen to twenty minutes when the temperature of the bead when applied is between about 30°–100° F.

11. A method as recited in claim 5, wherein said method includes applying a substantially uniform bead of liquid polyurethane resin adhesive along substantially the entire length of each of said support surfaces of said support members having a width of about ¼", then allowing said foamable resin to cream and rise to about ½" in width and height.

12. A method of permanently bonding a pair of relatively flat and flexible fibrous structural support panels to a plurality of structural support members to form a rigid enclosed structural panel assembly without mechanical fasteners or clamps, said method comprising the following-steps:
 (a) making a first panel assembly comprising a first of said structural support panels and with said plurality of support members being connected to said first panel and extending from a surface of said first panel, and orienting and supporting said support members in an orientation to be bonded to a second of said structural support panels;
 (b) thoroughly mixing a two-component liquid foamable resin adhesive in an impingement mixing chamber of a foam application gun;
 (c) applying a plurality of beads of said resin adhesive with said application gun to a generally flat top end face of each of said support members spaced from lateral edges of said top end face, each of said beads having a width substantially less than about the width of said top end face; and
 (d) pressing said top end faces of said support members against a surface of said second panel, compressing and spreading said beads between the support member top end faces and the panel member surface to wet said panel member and substantially the entire top end faces of said support member, and allowing said resin adhesive to cure, thereby permanently bonding said second panel to said support members and forming said rigid enclosed structural panel assembly.

13. The method as defined in claim 12, wherein said beads are of sufficient volume to substantially fully bridge the interface between said top end faces and said surface of said second panel, such that said second panel and said support members of said structural panel assembly do not touch.

14. The method as defined in claim 12, wherein said support members are relatively thin and elongated, said method including orienting and supporting said support members generally horizontally with said top end faces located at the top of said support members, then applying said beads of said two-component resin adhesive generally axially along said top end faces of said support members.

15. The method as defined in claim 14, wherein said resin adhesive comprises a two-component foamable polyurethane resin and said method includes turning said first panel assembly after said beads have substantially fully creamed and risen so that said top end faces are oriented downwardly overlying said second panel, then pressing said top end faces including said beads against said panel, and compressing and spreading said beads, thereby wetting said second panel and permanently bonding said support members to said second panel.

16. The method as defined in claim 12, wherein the formulation of said foamable resin adhesive comprises a two-component foamable polyurethane resin adhesive which is modified to cream and substantially fully rise in less than two minutes and cure within ten to thirty minutes when the temperature of said foam beads when applied ranges from about 30 to 100 degrees Fahrenheit.

17. A method of permanently bonding a relatively flat and flexible fibrous structural panel to a plurality of transverse, relatively thin support members to form a rigid structural panel assembly without mechanical fasteners, each of said support members having a generally flat support surface to be bonded to said panel, said method comprising the steps of:
 (a) orienting and supporting said support members horizontally, with said support surfaces located at the top of said support members;
 (b) applying a thin bead of a thoroughly-mixed liquid foamable resin adhesive generally axially along said support surface of each of said support members, said bead being spaced from lateral edges of said support surface, and having a width substantially less than about the width of said support surface;
 (c) allowing said bead to substantially fully cream and rise, forming an enlarged foam bead;
 (d) applying said relatively flexible fibrous panel to said support surfaces of said support members having said foam bead and applying pressure to said panel before said foam beads have cured, and compressing and spreading said enlarged bead between said support surfaces and said panel, thereby wetting said panel and substantially the entire support surfaces of said support members with said foamable resin adhesive and permanently bonding said support members to said panel, forming a relatively rigid structural panel assembly.

18. The method as defined in claim 17, wherein said method includes thoroughly mixing an A and B components of said two-component liquid polyurethane foamable resin adhesive in an impingement mixing chamber of a foam application gun and forming a relatively low forward velocity stream of said thoroughly mixed two-component liquid polyurethane foam resin adhesive exiting said foam application gun.

19. The method as defined in claim 18, wherein said method includes modifying the formulation of two-component foamable resin adhesive to rise in less than two minutes and cure in fifteen to twenty-five minutes at the temperature where the beads are applied.

20. The method as recited in claim 17, wherein said method comprises first laying a relatively flexible fibrous structural panel on a flat support surface, applying said bead of liquid foamable resin adhesive to said support surfaces of said support members and allowing said bead to substantially fully rise and cream, then turning said support members to engage said support surfaces of said support members against said flexible fibrous support panel located on said flat support surface, forming said structural panel assembly.

21. The method as defined in claim 20, wherein said method includes forming said structural panel assembly and further comprising laying a second relatively flexible panel on a flat support surface, applying said thin bead of said foamable resin adhesive on said support surfaces of said support members, then turning said first panel assembly to engage said support surfaces against said second relatively flexible panel while located on said flat support surface, compressing and spreading said beads between said support surfaces and said second panel and forming an enclosed panel assembly comprising said first and second panels permanently bonded to and spaced in generally parallel relation to said support members.

* * * * *